US006201580B1

United States Patent
Voltz et al.

(10) Patent No.: US 6,201,580 B1
(45) Date of Patent: Mar. 13, 2001

(54) APPARATUS FOR SUPPORTING MULTIPLE VIDEO RESOURCES

(75) Inventors: Christopher Voltz; John C. Barker, both of Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/835,760

(22) Filed: Apr. 8, 1997

Related U.S. Application Data

(60) Provisional application No. 60/043,206, filed on Mar. 31, 1997.

(51) Int. Cl.[7] .................................................. H04N 9/79
(52) U.S. Cl. .......................... 348/584; 348/554; 348/705; 348/663; 348/552
(58) Field of Search ................................... 348/552, 554, 348/555, 705, 706, 663, 584, 598, 423, 722; 386/1, 2, 46; H04N 9/79

(56) References Cited

U.S. PATENT DOCUMENTS

| | | | |
|---|---|---|---|
| 4,980,836 | | 12/1990 | Carter et al. ........................ 364/483 |
| 5,144,548 | * | 9/1992 | Salandro ............................. 364/138 |
| 5,241,389 | * | 8/1993 | Bilbrey ................................ 348/552 |
| 5,327,243 | * | 7/1994 | Maietta et al. ...................... 348/565 |
| 5,420,534 | * | 5/1995 | Elabd .................................. 327/404 |
| 5,426,731 | * | 6/1995 | Masukane et al. .................. 395/501 |
| 5,448,307 | * | 9/1995 | Gelissen et al. .................... 348/584 |
| 5,485,553 | * | 1/1996 | Kovalick et al. ................... 395/106 |
| 5,485,554 | * | 1/1996 | Lowitz et al. ....................... 395/116 |
| 5,561,472 | * | 10/1996 | Maietta et al. ...................... 348/565 |
| 5,590,252 | * | 12/1996 | Silverbrook ......................... 345/433 |
| 5,625,406 | * | 4/1997 | Newberry et al. ...................... 348/7 |
| 5,640,332 | * | 6/1997 | Baker et al. ........................ 345/197 |
| 5,673,204 | * | 9/1997 | Klingelhofer ....................... 348/578 |
| 5,675,390 | * | 10/1997 | Schindler et al. .................. 345/327 |
| 5,732,182 | * | 3/1998 | Masuda et al. ......................... 386/1 |
| 5,781,182 | * | 7/1998 | Liu et al. ............................... 386/1 |
| 5,781,250 | * | 7/1998 | Jun .................................... 348/706 |
| 5,883,670 | * | 3/1999 | Sporer et al. ....................... 348/384 |

OTHER PUBLICATIONS

Philips Semiconductors, TDA8540 4x4 Video Switch Matrix, Philips Semiconductors, p. 1, Feb. 6, 1995.*

* cited by examiner

*Primary Examiner*—Michael Lee
*Assistant Examiner*—Jean W. Desir
(74) *Attorney, Agent, or Firm*—Sharp, Comfort & Merrett, P.C.

(57) ABSTRACT

A multiplexing apparatus for use in a computer system is disclosed. The multiplexing system is typically designed for multiplexing various sources of video signal inputs for subsequent processing. The multiplexing apparatus includes at least one analog video input connector, but preferably has more than one, a programmable signal connector, and a plurality of video output connectors. The programmable signal connector couples to the analog video input connector and selectively multiplexes the analog video input signal. The plurality of video output connectors are further coupled to the programmable signal connector, and they receive the multiplexed video signal from the analog video input connector for processing through at least a first video stream. Additional video streams are also possible for processing for a single input signal.

14 Claims, 3 Drawing Sheets

APPARATUS FOR SUPPORTING MULTIPLE VIDEO RESOURCES

PRIORITY FILING DATE

Priority filing date for the present application is claimed under Provisional application, Ser. No. 60/043,206, filed Mar. 31, 1997, titled "APPARATUS FOR SUPPORTING MULTIPLE VIDEO RESOURCES."

RELATED APPLICATIONS

This application is related to co-pending application Ser. No. 08/841,965, filed on Apr. 8, 1997, entitled "APPARATUS FOR PROVIDING VIDEO RESOLUTION COMPENSATION WHEN CONVERTING ONE VIDEO SOURCE TO ANOTHER VIDEO SOURCE," incorporated by reference herein.

BACKGROUND OF THE INVENTION

1. The Field of the Invention

The present invention relates generally to computer video systems and, more specifically, to computer video systems that support multiple video resources. More specifically still, the present invention relates to apparatus for providing the multiplexing of a plurality of video sources for processing within a computer system for display.

2. Prior Art

Video processing in a computer system, along with the use of a graphics controller for display of the processed video signal, is well-known in the computer arts. Multimedia computer systems utilize video processing in order to provide more and greatly diversified resources in a computer system. Various resources of video include S-video, composite video, and RF sources such as over-the-air broadcast or cable input. These types of video sources are analog signals that must be converted to digital signals for processing prior to output to a video monitor typically connected to the graphic controller of the computer system.

Before the signal can be decoded and transformed into digital signals, the analog signal must be broken into separate components, specifically, the Y signal or luma and the C component or chroma. When the signal is an S-video analog signal, the Y and C components of the signal are already separated. In a composite signal, both the Y and the C component are combined to form a composite signal that must be separated into the luma and chroma portions before further processing of the analog signal can be performed.

Currently, computer systems may be able to accept input from selected analog video sources such as a composite signal or an S-video signal, but have not been able to handle multiple input signals, whether from the same source, or in a more complicated arrangement, from different types of sources. The different types of sources may be one signal input of a composite signal and another of an input signal may be an S-video analog signal. Further complicating this is when a signal tuner is provided that tunes an analog video signal from a broadcast source, which also has a composite type signal combining the Y and the C components of the analog signal.

Without being able to handle multiple video resources, a computer system would be limited to showing but a single display source in along a single video path. In today's multimedia environment, it is often desirable to be able to switch between a first and a second source, as well as to be able to display a primary source with a secondary source in a picture-in-picture (PIP) window much smaller than the primary image somewhere on the display screen or to be able to simultaneously extract vertical blanking interval (VBI) information. Thus, to display multiple video sources, a system must be able to receive multiple input sources, decode the analog video sources and then pass them to the appropriate signal decoders and graphics processors for translating the analog signals into a digital format for display on a video monitor or other processing.

SUMMARY OF THE INVENTION

According to the present invention, a multiplexing apparatus for use in a computer system is disclosed. The multiplexing system is typically designed for multiplexing various sources of video signal inputs for subsequent processing. The multiplexing apparatus includes at least one analog video input, but preferably has more than one, a programmable analog switch, and a plurality of video outputs. The programmable analog switch couples to the analog video inputs and selectively multiplexes the analog video input signal. The plurality of video outputs are further coupled to the programmable analog switch, and they receive the multiplexed video signal from the analog video input for processing through at least a first video stream. Additional video streams are also possible for processing for a single input signal.

Proper signal isolation typically requires an isolation capacitor be provided for each of the plurality of video inputs. Further, a signal input buffering means is also provided for at least one of the at least one analog video inputs. The programmable analog switch further includes a first stage and a second stage. Each stage is capable of receiving at least one of the analog video inputs and being output to at least one of the plurality of video output connectors. The first stage receives a first portion of an analog video signal input through the video connector, while the second stage receives a second portion of the analog video signal. These analog video signals can include an S-video signal or a composite video signal, both of which include a chroma portion and a luma portion corresponding to the first portion and second portion, respectively. This particular video multiplexing system is implemented in a computer system and further includes a method of multiplexing.

The method of directing signals to various output sources is as follows. Initially, at least one analog video signal is input. Next, this particular analog signal is then controlled in a selective manner via a programmable design for subsequent output to at least one video stream. Further, additional video streams are contemplated as are additional input analog video signals that would be handled much in the same way as the at least one input analog video signal.

DETAILED DESCRIPTION OF THE SPECIFIC EMBODIMENTS

Figure 1:
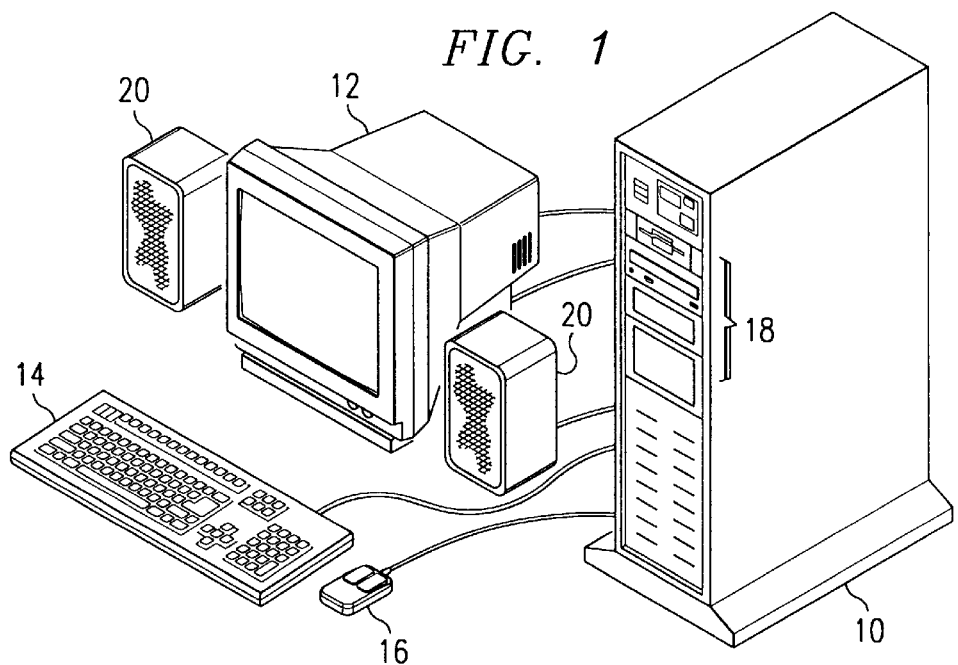
FIG. 1 is a block diagram of a multimedia computer system according to the present invention.
Figure 3:
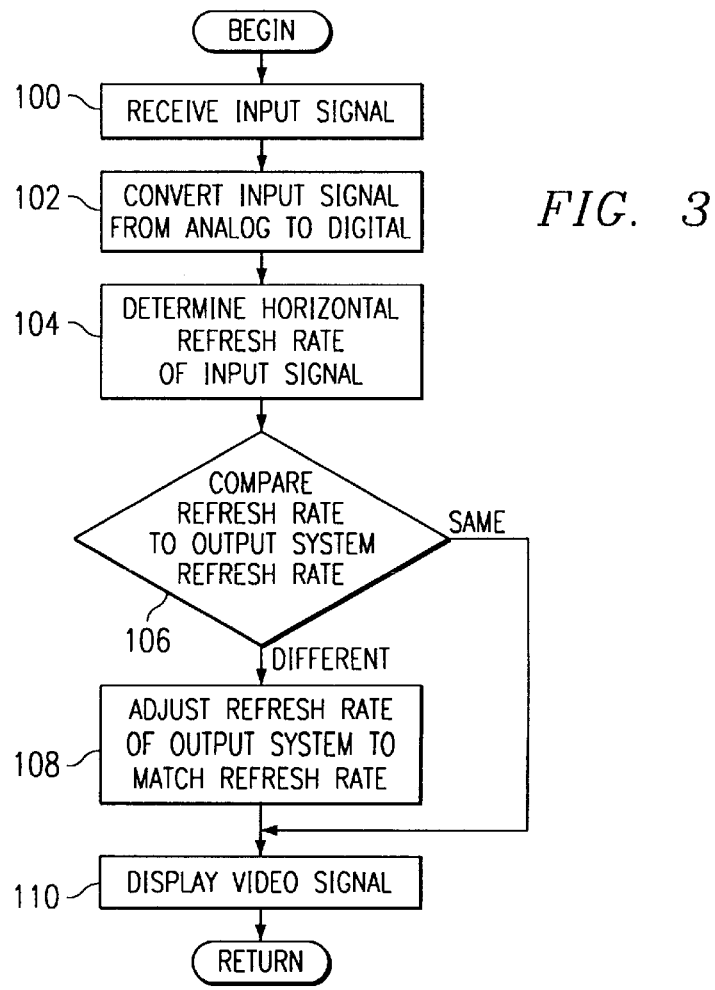
FIGS. 2A, 2B & 3 are block diagrams of the video controller used with the computer system of FIG. 1.

Illustrated now in FIG. 1 is a computer system 10 according to the present invention. Computer 10 includes multimedia features and devices and includes a video monitor display 12, a keyboard 14, a pointing device such as mouse 16, disk storage device 18, and audio speakers 20. Disk storage device 18 may be any type of disk storage technology such as a floppy disk drive, a hard disk drive, or compact disc readable memory drive, or other type writeable or erasable storage devices typically known to those skilled in the art. Keyboard 14 provides data input for the user, as does pointing device 16. Additionally, video display 12 is typically a progressive scan, multi-sync monitor, but may also be able to display interlaced scanned imaging.

Within computer 10 there are other various devices for operation. These devices include a central processing unit, such as those typically provided by the Intel Corporation, such as the Pentium microprocessor, or the PowerPC microprocessor manufactured by IBM that is available for personal computing systems. It is intended that the microprocessor used within computer 10 be of such a design that it is not specifically limited to any of these types of microprocessor systems, but rather can be applied to any type of microprocessor processing system typically used in a personal computing system. Additionally, short-term memory that is operating at the same operating speed as the CPU, typically known as "cache memory," can be included. Random access memory (RAM) is also included for holding information and is responsive in a speed not as fast as the CPU or the cache, but much faster than the transfer rate of the hard disk storage device or any other long-term storage device provided in the computer 10. Additional control elements and peripheral devices are incorporated in the computer, and the fundamental construction of the desktop computer does not diverge substantially from those typically well-known to those skilled in the art. Likewise, rather than a desktop computer system as depicted in FIG. 1, computer 10 may be a laptop or other portable computer systems that have their components miniaturized for convenience in bulk and weight and transportability.

A system bus is typically provided that connects the central processing unit to the various other devices, such as keyboard 14, display monitor 12, pointing device 16 and disk storage means 18. A typical bus system is the Peripheral Component Interconnect (PCI) standard bus implemented commonly in many computer systems, but other bus systems are possible, including EISA, ISA, and MicroChannel, as well as a local bus design.

Further connected to the bus are a video/graphics board 30 for processing video information for output to display monitor 12 and an audio/tuner board for separating the audio portion of some multimedia signals input to computer system 10 for processing for output through speakers 20.

Figure 2A:
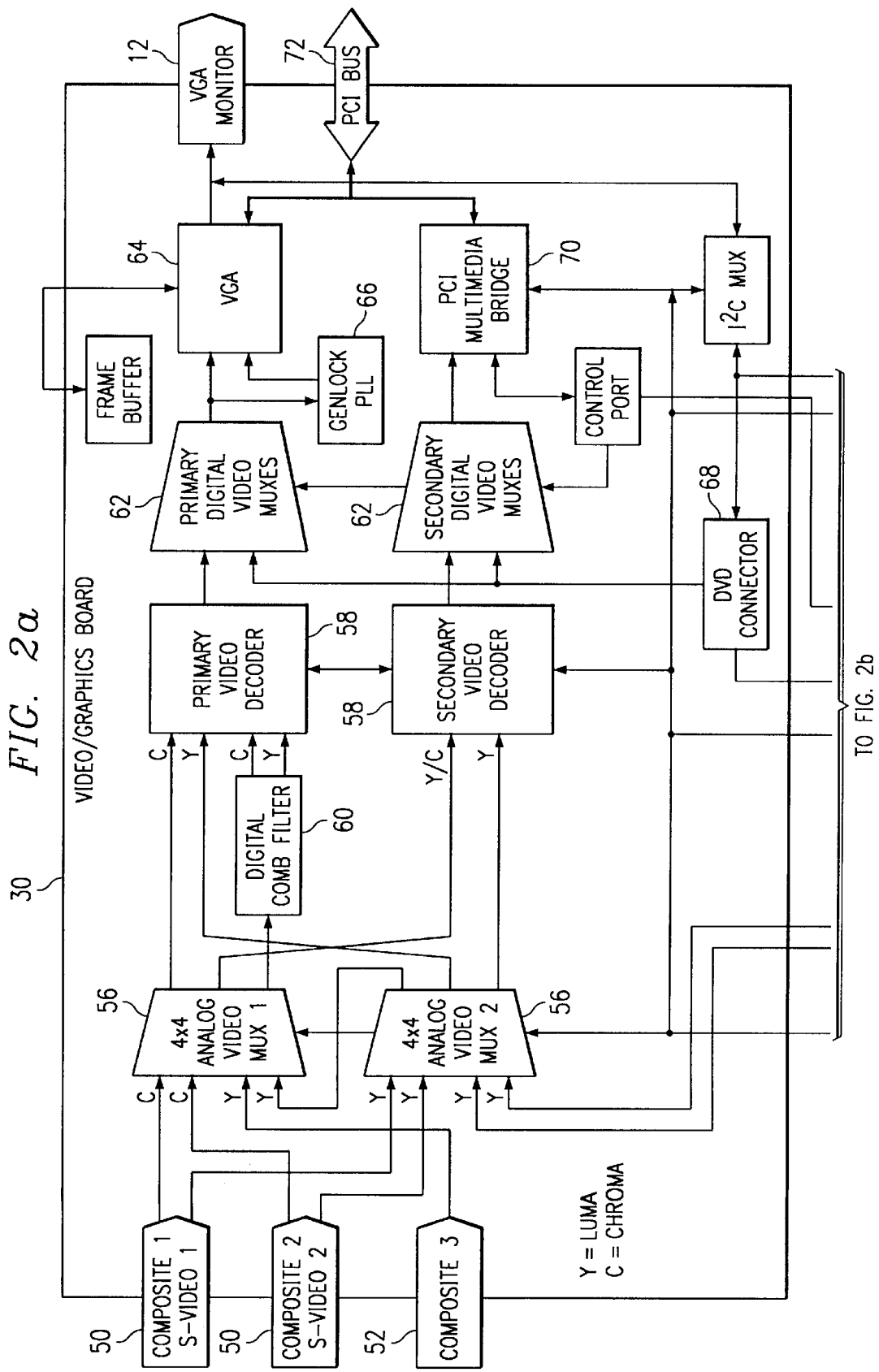
Figure 2B:
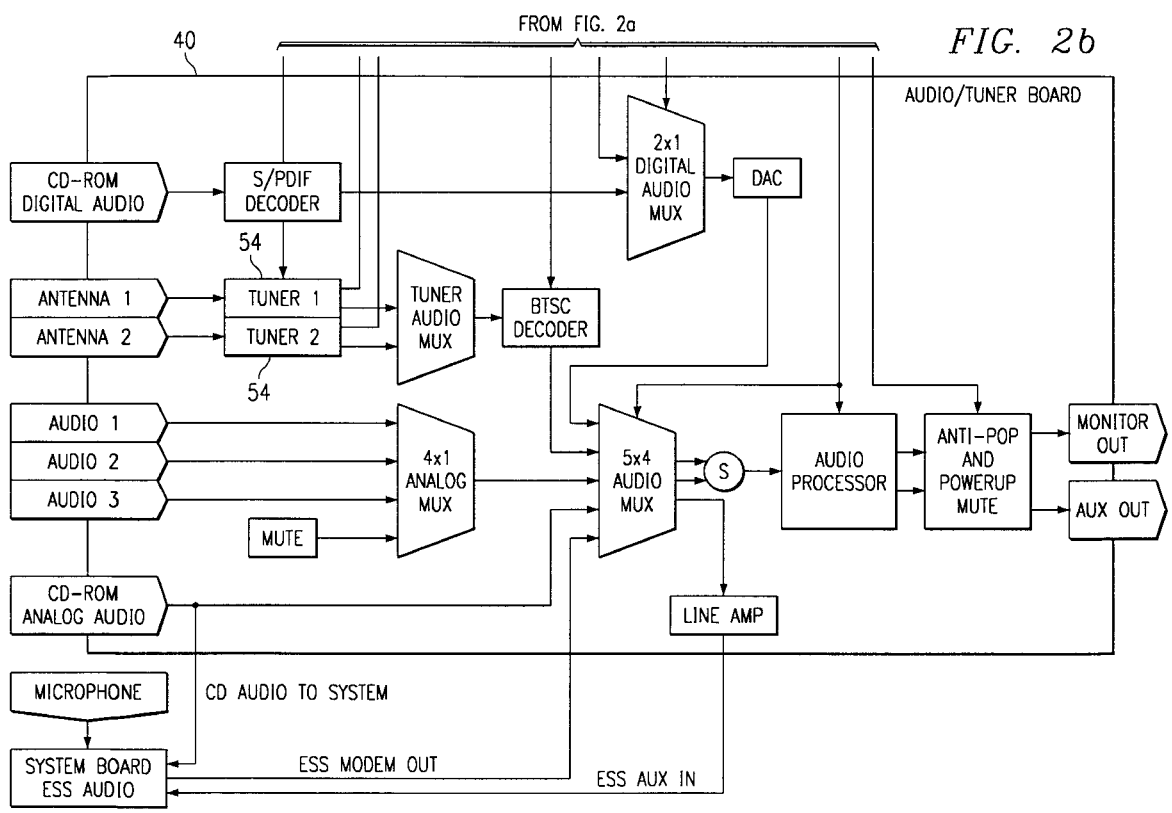

The video/graphics board 30 is further depicted in block diagram form in FIG. 2, as is audio/tuner board 40. Video/graphics board 30 can accept multiple video input sources such as S-video and composite video. These are input through S-video and composite connectors 50 and composite input connector 52. Additional input sources are provided from the audio/tuner board 40 through tuners 54, which provide RF tuning capability. The video input sources typically are analog signals that can be selected from System-M (NTSC), or any other type analog standard. Connectors 50, 52 and tuners 54 direct the signal to a first and second video multiplexers 56. When an S-video signal is sent to multiplexer 56, it is already separated into two different components. There is a Y component and a C component. The Y component includes the luma and synchronization necessary for the video signal, while the C component carries the chroma portion of the video signal. If the signal is in the form of a composite video signal, then the luma, chroma, and synchronization are all included and will be labeled under the Y component. Since connectors 50 can accept either a composite video signal or a S-video source, the connection for the chroma component is forwarded to the first video multiplexer 56, while the luma component is forwarded to the second video multiplexer 56. Likewise, the composite signal from RF tuner 54 is directed to the second video multiplexer 56.

Video multiplexers 56 are programmable so as to provide any combination of video signal output desired by the designer. A typical programming sequence for providing various combinations of signal output from different sources is depicted in Table 1. This illustrates how the primary video source is selected by the programmability of multiplexers 56. Likewise, the secondary video source selection is programmable through multiplexers 56.

| Primary Video Source Selection | Video Mux 1 | | Video Mux 2 | | Video Decoder |
|---|---|---|---|---|---|
| | Input | Output | Input | Output | |
| Composite 1 | 3 | 0 | 2 | 0 | S-Video 1 |
| Composite 2 | 3 | 0 | 3 | 0 | S-Video 1 |
| Composite 3 | 2 | 0 | — | — | S-Video 1 |
| S-Video 1 | 0 | 1 | 2 | 1 | S-Video 1 |
| S-Video 2 | 1 | 1 | 3 | 1 | S-Video 1 |
| Tuner 1 | 3 | 0 | 0 | 0 | S-Video 1 |
| Tuner 2 | 3 | 0 | 1 | 0 | S-Video 1 |
| Secondary Video Source Selection | Video Mux 1 | | Video Mux 2 | | Video Decoder |
| | Input | Output | Input | Output | |
| Composite 1 | — | — | 2 | 2 | Composite 2 |
| Composite 2 | — | — | 3 | 2 | Composite 2 |
| Composite 3 | 2 | 3 | — | — | Composite 4 |
| S-Video 1 | 0 | 2 | 2 | 3 | S-Video 2 |
| S-Video 2 | 1 | 2 | 3 | 3 | S-Video 2 |
| Tuner 1 | — | — | 0 | 2 | Composite 2 |
| Tuner 2 | — | — | 1 | 2 | Composite 2 |

A simple video multiplexer has been provided before, but no video multiplexer system has been provided that has been able to receive and manage multiple input sources and to multiple output destinations in the various combinations desired by the user or the designer. These combinations including, but not limited to a single video source, being delivered to multiple video streams. Accordingly, this video/graphics board 30 incorporates two programmable four-by-four video multiplexers 56, which can be obtained from Philips Corporation, Model No. TDA8540T. Parallel video streams or paths are provided to receive the signals from the first video multiplexer 56 and the second video multiplexer 56. Further, rather than use a large, single multiplexer, the multiple multiplexer design described herein allows great flexibility of programmability as each multiplexer can be independently programmed.

For composite video connector 52, the composite signal is sent to the first video multiplexer 56, which is then sent to video decoder 58 as composite or to digital comb filter 60, which separates the Y component from the C component of the signal and forwards the Y and C components to video decoder 58. Video decoder 58 is a Philips Corporation video decoder, Model No. SAA7111, type-decoder, but comparable equivalents can be selected instead and the invention is not so limited to one specific type of part.

The second video multiplexer 56 forwards its Y component either back to first video multiplexer 56 or to the first digital video decoder 58 or to the second digital video decoder 58.

The digital comb filter 60 processes the composite signal, which is divided into an S-video type signal which is sent to the first video decoder 58. Again, two paths are possible in that the first video decoder 58 sends the output signal to a first digital multiplexer 62, while the second video decoder 58 sends the decoded video signal to a second video multiplexer 62. Yet a third input source is possible at this time in that a digital video source may be input into either the first digital video multiplexer or the second digital video multiplexer 62. This connector is a digital multimedia connector 68 and also feeds an audio portion to the audio/tuner board 40. Typical digital video sources include MPEG encoded signal such as Digital Versatile Disk (DVD) and Digital Broadcast System (DBS).

The first digital video multiplexer 62 then selects the signal to provide the actual decoded video signal to be handled by a graphics controller 64 with timing information being sent to a phase lock loop (PLL) circuit, further connected to the graphics controller 64. The decoded signal from the second digital video decoder 58 is then multiplexed through the second digital video multiplexer 62 being selected from the decoded signal from video decoder 58 or from digital video source connector 68. This signal from the second digital video multiplexer 62 then proceeds to a second video processor 70. Video processor 70 performs additional video functions such as video scaling and also provides for a bus interface with the PCI bus 72 that interconnects the computer components one to another, as well as interconnects the secondary video processor 70 with the primary graphics controller 64. Then the final signal is output through primary graphics controller 64 to monitor 12.

The interconnection between multiplexers 56, video decoders 58, tuners 54, and video processor 70 are all accomplished over an IIC bus, which is the "inter-integrated circuit" bus and is also known as the I$^2$C bus.

With multiple input and output sources now incorporated in the computer system, impedance problems now occur that didn't previously occur. For example, where a single video source is output to multiple video streams, the single video signal needs to be boosted, or buffered in order to support multiple video streams without undue degradation caused by the impedance change. Accordingly, multiplexers 56 include a buffer to allow the multiplexing of a single video signal to multiple video paths without such signal degradation. Signal isolation to the circuit is further provided to prevent each output and input connector from interfering with any of the others at all times.

The interaction between the video decoders 58, the digital video multiplexers 62 and graphics controller 64, PLL 66, and secondary video controller 70 is an important function of this system, especially where the video resolution enhancement provisions are concerned. The interaction is described in detail in U.S. patent application Ser. No. 08/828,522, entitled "HARDWARE SYSTEM FOR GENLOCKING," herein incorporated by reference for all purposes. Additionally, additional support for the processing of the video signals is described in U.S. patent application Ser. No. 08/827,977, entitled "METHOD AND APPARATUS FOR OFFSET OF VIDEO FIELDS," herein incorporated by reference for all purposes.

Within this system, the analog video signals that are to be displayed on the computer system that uses a standard PC graphics controller must be converted to be viewable on the computer video monitor. The analog signal can be in a non-standard refresh or sampling rate with a non-conforming resolution rate that translates poorly when displayed on the video monitor. As is well known, analog signals in System-M (NTSC) standard (as are many other applicable video standards) are interlaced and may have a conversion resolution of 720 by 480 pixels using a 13.5 MHz sampling clock. The standard pixel rate for the system display is 25 MHz, which translates to a resolution of 640×480. Since the resolution is lower in the standard display than is the resolution of the converted analog input signal, signal quality is affected and a lesser image is viewed than would otherwise be possible.

One solution would be to display the image at a much higher resolution, for example, 800×600, but this is a higher resolution than the converted video source's 720×480 and since the input signal does not have this high a resolution, a poor image would again result. This poor image would have black boarders either vertically, horizontally, or both. Further, memory is wasted by over allocating such a high resolution to an image having a lesser resolution. Another solution would be to scale the 720×480 image down to 640×480 or to sample the convert the analog input to a 640×480 resolution using a different sampling rate (i.e., square pixel samping). Both of these approaches result in a loss of resolution and may result in aspect ratio problems.

So, the solution is to display the 720×480 non-standard resolution in the same time it takes to display the 640×480 standard resolution of the system display. This requires the graphics controller to increas the horizontal pixel rate to compensate for the additional pixels to be displayed. Further, with this modification of the display rate, the pixel aspect ratio of the input analog signal is preserved as no other conversion or translation is necessary. Thus, the 4:3 aspect ratio of the System-M (NTSC) standard is not put in the square pixel aspect ratio (i.e. 1:1) of the standard display resolution used in personal computers.

It is significant that this adjustment of the horizontal rate is performed in systems using analog displays. The use of this system would not be applicable to screens that are digital displays, such as square pixel LCD displays and the like.

Since there is provided a primary and a secondary video path, the secondary path provides for a second channel to be viewed and output. Typically, this second channel is scaled to be much smaller than the full field of display on monitor 12. This scaled image is a picture-in-picture (PIP) image for display on display monitor 12. This is shown in a selected location within the display. Further, this second video path can carry information such as that defined in Vertical Blanking Interval (VBI) that can carry other information such as from the Internet or other sources. In either case, the signal typically is processed in a YUV color space, but can also be processed in other color spaces, for example in RGB, as well. In order to be output to the display monitor 12, the secondary video processor 70 performs a burst mode over the PCI bus 72 to a graphics frame buffer within graphics controller 64. Before this, optional scaling of the image to conform to PIP standards may be performed in secondary video processor 70. Thus, the invention has been described with particular detail and understanding for implementation. It has been shown that a novel multiple analog video source multiplexer system has been provided that allows selection of various input sources for further processing and eventual output to the progressive scan monitor 12 within the system. This video multiplexer further has a connector scheme for accepting either S-video signals or composite video signals. In these connectors, the composite video signal connects to the S-video luma line, which shares a signal between the two connectors, with only one line being populated at a time. Additionally, the S-video and composite video typically are carried over four-pin mini-DIN, and the composite video alone is delivered over an RCA-type pin. Furthermore, an additional digital-to-analog converter can also be provided, when the output signal although having been processed from analog to digital is to be viewed on an analog video monitor. Accordingly, such a digital-to-analog conversion is then performed for output to such an analog display monitor.

It has been shown how to compensate a video image being converted from analog form to digital form so that the eventual display on a progressive scan analog monitor does not suffer the side effects of such a conversion. This conversion is achieved by adjusting the graphic controller's pixel rate to match the analog input source's conversion resolution.

The foregoing disclosure and description of the invention are illustrative and explanatory thereof, and various changes in the size, shape, materials, components, circuit elements, wiring connections and contacts, as well as the details of the illustrated design and construction and method of operation may be made without departing from the spirit of the invention.

What is claimed:

1. A video multiplexer apparatus comprising:

a plurality of video input connectors that supply video signals, where some of the video signals are discrete video signals that have multiple discrete components, and some of the signals are combined video signals that have multiple components combined into a single signal;

a plurality of programmable signal connectors, having video inputs and video outputs, said video inputs connected to receive video signals from said video input connectors, said programmable signal connectors operable to selectively multiplex the video signals received from said the video input connectors, wherein the video input convectors are coupled to said video inputs such that one programmable signal connector receives discrete video signal components of one type from different ones of said video inputs, and another one of said programmable signal connectors receives discrete video signal components of another type from different ones of said video inputs;

a plurality of video output connectors, coupled to the video outputs of the plurality of programmable signal connectors, for receiving output video signals from the plurality of programmable signal connectors for processing through a first video stream and a second video stream;

wherein at least one of said combined video signals is coupled from a video output of a first programmable signal connector to a video input of a second programmable signal connector, and then from a video output of the second programmable signal connector to a digital comb filter to separate the components of said composite video signal into respective signal streams.

2. The apparatus according to claim 1 wherein some of the discrete video signals are S-video signals that have a chroma component and a luma component.

3. A computer system comprising:

data input device;

a processing unit, coupled to the data input device;

a video output device, coupled to the data input device; and a video multiplexer apparatus comprising:

a plurality of video input connectors that supply video signals, where some of the video signals are discrete video signals that have different discrete components, and some of the signals are combined video signals that have multiple components that are combined into a single signal;

a plurality of programmable signal connectors, having video inputs and video outputs, that selectively multiplex the video signals supplied by the video input connectors, wherein the different discrete components of the discrete video signals are coupled to respective programmable signal connectors such that discrete components of the same type are coupled to the same programmable signal connector;

a plurality of video output connectors, coupled to the video outputs of the plurality of programmable signal connectors, for receiving output video signals from the plurality of programmable signal connectors for processing through either a first video stream or a second video stream;

wherein the combined video signals include a composite video signal that has a chroma component and a luma component said composite video signal being output from a first programmable signal connector to a second programmable signal connector and then to a digital comb filter which separates into separate signals, the chroma and luma components of said composite video signal.

4. The computer system according to claim 3 wherein some of the discrete video signals are S-video signals that each has a chroma component and a luma component.

5. A video multiplexer apparatus comprising:

means for inputting video signals, where some of the video signals are discrete video signals that have multiple discrete components, and some of the signals are combined video signals that have multiple components combined into a single signal;

means for connecting programmable signals, having video inputs and video outputs, said video inputs connected to receive video signals from said video input connectors, said programmable signal connectors operable to selectively multiplex the video signals received from the video input connectors, wherein the video input convectors are coupled to said video inputs such that one means for connecting programmable signals receives discrete video signal components of one type from different ones of said video inputs, and another one of said means for connecting programmable signals receives discrete video signal components of another type from different ones of said video inputs;

means for outputting video signals, coupled to the video outputs of the means for connecting programmable signals, for receiving output video signals from the plurality of programmable signal connectors for processing through one of a first video stream and a second video stream;

wherein at least one of the combined video signals is coupled from a video output of a first programmable signal connector means to a video input of a second programmable signal connector means, and then from a video output of the second programmable signal connector means to a means for filtering the composite video signal into respective luma and chroma signal components.

6. The apparatus according to claim 5 wherein some of the discrete video signals are S-video, signals that have a chroma component and a luma component.

7. A method for multiplexing video signals, comprising:

supplying a plurality of video signals, where some of the video signals are discrete video signals that have multiple discrete components of different types, and some of the signals are combined video signals that have multiple components combined into a single signal;

multiplexing the plurality of video signals with a plurality of programmable signal connectors, wherein discrete components of the discrete video signals are coupled to different programmable signal connectors such that discrete signal components of a same first type are coupled to one programmable signal connector, and discrete signal components of a same second type are coupled to a different programmable signal connector;

receiving a plurality of output video signals from the plurality of programmable signal connectors, wherein the output video signals have been multiplexed; and routing a particular output video signal through one of a first video stream and a second video stream;

wherein at least one of the combined video signals is a composite video signal that has a chroma component and a luma component, the composite video signals being sent to a first programmable signal connector then to a second programmable signal connector, and then to a digital comb filter where the chroma and luma components of the composite video signals are separated.

8. The method according to claim 7, further comprising sending a particular output video signal from a first programmable signal connector to a second programmable signal connector.

9. The method according to claim 7 wherein some of the discrete video signals are S-video signals that have a chroma component a luma component.

10. Video signal processing apparatus comprising: first and second video multiplexers, each having video signal inputs and video signal outputs;

video inputs of said first video multiplexer coupled to receive respective first-type discrete signal components of respective discrete video signals having multiple discrete signal components;

video inputs of said second video multiplexer coupled to receive respective second-type discrete signal components of said respective discrete video signals having multiple discrete signal components;

said first video multiplexer having another input coupled to receive a combined video signal having multiple signal components combined into a single signal;

said second video multiplexer having a video output coupled to a further video input of said first video multiplexer for selectively coupling said second-type signal components from said second video multiplexer to said first video multiplexer;

said first video multiplexer having a video output coupled to a first video decoder to selectively couple one of said first-type discrete signal components from said first video multiplexer to an input of said first video decoder;

said first video multiplexer having another video output coupled to said first video decoder to selectively couple said combined video signal from said first video multiplexer to an input of said first video decoder;

said second video multiplexer having a video output coupled to said first video decoder to selectively couple one of said second-type discrete signal components from said second video multiplexer to another input of said first video decoder; and said first video decoder having a decoded video signal output coupled to a video signal processor for supplying a decoded output video signal for input to a display device.

11. Video signal processing apparatus according to claim 10, wherein said another video output of said first video multiplexer is coupled to said first video decoder by a digital filter to output first-type and second-type signal components from said combined video signal to separate inputs of said first video decoder.

12. Video signal processing apparatus according to claim 11, wherein said first-type signal component is a chroma signal component, and said second-type signal component is a luma signal component.

13. Video signal processing apparatus according to claim 10, wherein said first video multiplexer has a further video output coupled to a second video decoder to selectively couple one of said first-type or one of said second-type discrete signal components from said first video multiplexer to an input of said second video decoder;

wherein said second video decoder has a video output coupled to supply a decoded video signal to a signal processing device having an output coupled to an input of said video signal processor.

14. Video signal processing apparatus according to claim 13, wherein said video signal processor and said signal processing device each has an output coupled to a common bus.

\* \* \* \* \*

UNITED STATES PATENT AND TRADEMARK OFFICE
CERTIFICATE OF CORRECTION

| | |
|---|---|
| PATENT NO. | : 6,201,580 B1 |
| DATED | : March 13, 2001 |
| INVENTOR(S) | : Voltz, et al. |

Page 1 of 1

It is certified that error appears in the above-identified patent and that said Letters Patent is hereby corrected as shown below:

<u>Title page,</u>
Change,
(60)"Provisional application No, 60/043,206 filed on Mar. 31, 1997" to
(60) -- Provisional application No, 60/043,206 filed on Apr. 8, 1997 --

Signed and Sealed this

Twenty-fifth Day of September, 2001

Attest:

*Nicholas P. Godici*

Attesting Officer

NICHOLAS P. GODICI
*Acting Director of the United States Patent and Trademark Office*